(12) United States Patent
Hunukumbure et al.

(10) Patent No.: US 11,375,462 B2
(45) Date of Patent: Jun. 28, 2022

(54) METHOD AND APPARATUS FOR PHASE TRACKING REFERENCE SIGNAL IN A WIRELESS COMMUNICATION SYSTEM

(71) Applicant: Samsung Electronics Co., Ltd, Suwon-si (KR)

(72) Inventors: Mythri Hunukumbure, Middlesex (GB); Yinan Qi, Middlesex (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 142 days.

(21) Appl. No.: 16/497,416

(22) PCT Filed: Mar. 22, 2018

(86) PCT No.: PCT/KR2018/003328
§ 371 (c)(1),
(2) Date: Sep. 24, 2019

(87) PCT Pub. No.: WO2018/174578
PCT Pub. Date: Sep. 27, 2018

(65) Prior Publication Data
US 2020/0045653 A1   Feb. 6, 2020

(30) Foreign Application Priority Data

Mar. 24, 2017 (GB) ...................... 1704731

(51) Int. Cl.
*H04B 7/185* (2006.01)
*H04W 52/42* (2009.01)
(Continued)

(52) U.S. Cl.
CPC .......... *H04W 52/42* (2013.01); *H04B 7/0452* (2013.01); *H04B 17/336* (2015.01);
(Continued)

(58) Field of Classification Search
CPC .. H04B 7/0408; H04B 7/0452; H04B 7/0617; H04B 17/336; H04L 5/0048;
(Continued)

(56) References Cited

U.S. PATENT DOCUMENTS 6,091,703 A * 7/2000 Saunders ............... H04B 7/216
370/210
7,999,622 B2   8/2011 Galton et al.
(Continued)

FOREIGN PATENT DOCUMENTS

EP          1341355 A2     9/2003
WO       2018/088816 A1    5/2018

OTHER PUBLICATIONS

MCC Support, Final Report of 3GPP TSG RAN WG1 #89 v1.0.0, Hangzhou, China, May 15-19, 2017), Aug. 21-25, 2017, 164 pages.
(Continued)

*Primary Examiner* — Bo Hui A Zhu

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). Described is a method for providing a Phase Tracking Reference Signal (PTRS) in a wireless communication system. The method comprises transmitting, by a base station to a plurality of mobile devices, the PTRS in a wide beam transmission at a first power level. The first power level is set such that at least some of the mobile devices receive the PTRS with a sufficiently high signal strength to enable the PTRS to be correctly received and such that at least some of the mobile devices receive the PTRS with a sufficiently low signal strength to enable the PTRS to be processed as manageable interference. A first mobile device may estimate the Signal to Interference plus Noise Ratio (SINR) of the received PTRS, and transmit, to the base station, feedback informa-
(Continued)

tion based on the estimated SINR. The base station may transmit, to the first mobile device, a narrow beam transmission comprising one or more allocated Resource Elements (REs) configured according to the feedback information. The allocated REs may be configured to (i) be left empty, so as to carry no information, (ii) contain data, or (iii) contain PTRS.

17 Claims, 6 Drawing Sheets

(51) Int. Cl.
| | |
|---|---|
| H04B 17/336 | (2015.01) |
| H04B 7/0452 | (2017.01) |
| H04L 1/00 | (2006.01) |
| H04W 52/14 | (2009.01) |
| H04W 52/24 | (2009.01) |

(52) U.S. Cl.
CPC ......... *H04L 1/0004* (2013.01); *H04W 52/143* (2013.01); *H04W 52/243* (2013.01); *H04W 52/245* (2013.01)

(58) Field of Classification Search
CPC ............. H04W 52/241; H04W 52/242; H04W 52/243; H04W 52/245
See application file for complete search history.

(56) References Cited

U.S. PATENT DOCUMENTS

| | | | |
|---|---|---|---|
| 2011/0170496 A1 | 7/2011 | Fong et al. | |
| 2012/0320874 A1 | 12/2012 | Li et al. | |
| 2013/0259174 A1 | 10/2013 | Qian et al. | |
| 2018/0351719 A1 | 12/2018 | Lee et al. | |
| 2019/0081844 A1* | 3/2019 | Lee | ....................... H04L 25/023 |

OTHER PUBLICATIONS

MCC Support, Final Report of 3GPP TSG RAN WG1 #AH_NR2 v1.0.0, Qingdao, China, Jun. 27-30, 2017), Aug. 21-25, 2017, 109 pages.
"3rd Generation Partnership Project; Technical Specification Group Radio Access Network; Study on New Radio (NR) access technology (Release 14)", 3GPP TR 38.912 v14.1.0 (Jun. 2017), 74 pages.
NTT Docomo, "Status Report for RAN WG1 to TSG-RAN #76", Jun. 5-8, 2017, RP-170858, 35 pages.
"RAN1 Chairman's Notes", 3GPP TSG RAN WG1 Meeting #88bis, Apr. 3-7, 2017, 113 pages.
LG Electronics, "Discussion on Phase Tracking RS for DL", 3GPP TSG RAN WG1 Meeting #88, Feb. 13-17, 2017, R1-1702463, 7 pages.
Qualcomm Incorporated, "Phase and frequency tracking reference signal considerations", 3GPP TSG-RAN WG1 #88, Feb. 13-17, 2017, R1-1702617, 8 pages.
Samsung, "PT-RS design", 3GPP TSG RAN WG1 #88, Feb. 13-17, 2017, R1-1702959, 7 pages.
Ericsson, "On PTRS design", 3GPP TSG-RAN WG1 #88, Feb. 13-17, 2017, R1-1703220, 5 pages.
Huawei, HiSilicon, "Further details for PT-RS design", 3GPP TSG RAN WG1 Meeting #88b, Apr. 3-7, 2017, R1-1704240, 5 pages.
ZTE et al., "Discussion on RS for phase tracking", 3GPP TSG RAN WG1 Meeting #88bis, Apr. 3-7, 2017, R1-1704413, 5 pages.
CATT, "Further discussion on RS for phase tracking for DL", 3GPP TSG RAN WG1 Meeting #88bis, Apr. 3-7, 2017, R1-1704564, 2 pages.
LG Electronics, "On DL PT-RS design", 3GPP TSG RAN WG1 Meeting #88bis, Apr. 3-7, 2017, R1-1704890, 3 pages.
Samsung, "DL PT-RS design", 3GPP TSG RAN WG1 #88bis, Apr. 3-7, 2017, R1-1705355, 7 pages.
NTT Docomo, Inc., "Discussion on PT-RS", 3GPP TSG RAN WG1 Meeting #88bis, Apr. 3-7, 2017, R1-1705726, 3 pages.
Ericsson, "On DL PTRS Design", 3GPP TSG-RAN WG1 #88bis, Apr. 3-7, 2017, R1-1705906, 11 pages.
Ericsson et al., "Merged WF on PTRS structure", 3GPP TSG RAN WG1 Meeting #88bis, Apr. 3-7, 2017, R1-1706676, 2 pages.
Huawei, HiSilicon, "PTRS for CP-OFDM", 3GPP TSG RAN WG1 Meeting #89, May 15-19, 2017, R1-1706937, 6 pages.
ZTE, "Discussion on RS for phase tracking", 3GPP TSG RAN WG1 Meeting #89, May 14-19, 2017, R1-1707132, 11 pages.
Panasonic, "DL PT-RS port association, multiplexing and indication", 3GPP TSG RAN WG1 Meeting #89, R1-1707189, 3 pages.
Intel Corporation, "On PT-RS for CP-OFDM", 3GPP TSG-RAN WG1 #89, May 15-19, 2017, R1-1707366, 8 pages.
LG Electronics, "On DL PT-RS design", 3GPP TSG RAN WG1 Meeting #89, May 15-19, 2017, R1-1707616, 6 pages.
Samsung, "On DL PT-RS design", 3GPP TSG RAN WG1 #89, May 15-19, 2017, R1-1707976, 5 pages.
CMCC, "Phase-tracking reference signal design for DL CP-OFDM", 3GPP TSG RAN WG1 Meeting #89, May 15-19, 2017, R1-1708392, 5 pages.
NTT Docomo, Inc., "Views on PT-RS", 3GPP TSG RAN WG1 Meeting #89, May 15-19, 2017, R1-1708461, 4 pages.
Qualcomm Incorporated, "Phase and frequency tracking reference signal considerations", 3GPP TSG-RAN WG1 #89, May 15-19, 2017, R1-1708599, 6 pages.
Ericsson, "On DL PTRS design", 3GPP TSG-RAN WG1 #89, May 15-19, 2017, R1-1708707, 9 pages.
Nokia et al., "Discussion on PT-RS design for CP-OFDM", 3GPP TSG RAN WG1 #89, May 15-19, 2017, R1-1708927, 10 pages.
Huawei, HiSilicon, "PTRS for CP-OFDM", 3GPP TSG RAN WG1 Ad Hoc Meeting, Jun. 27-30, 2017, R1-1709939, 6 pages.
Samsung, "On DL PT-RS design", 3GPP TSG RAN WG1 NR Ad-hoc#2, Jun. 27-30, 2017, R1-1710686, 5 pages.
NTT Docomo, Inc., "New WID on New Radio Access Technology", 3GPP TSG RAN Meeting #75, Mar. 6-9, 2017, RP-170847, 8 pages.
Chaiman Lim et al., "Recent Trend of Multiuser MIMO in LTE-Advanced", Nov. 1, 2012, 20 pages.
International Search Report dated Jun. 28, 2018 in connection with International Patent Application No. PCT/KR2018/003328, 3 pages.
Search Report dated Sep. 5, 2018 in connection with United Kingdom Patent Application No. GB1704731.7, 3 pages.
Written Opinion of the International Searching Authority dated Jun. 28, 2018 in connection with International Patent Application No. PCT/KR2018/003328, 7 pages.

\* cited by examiner

[Fig. 1]
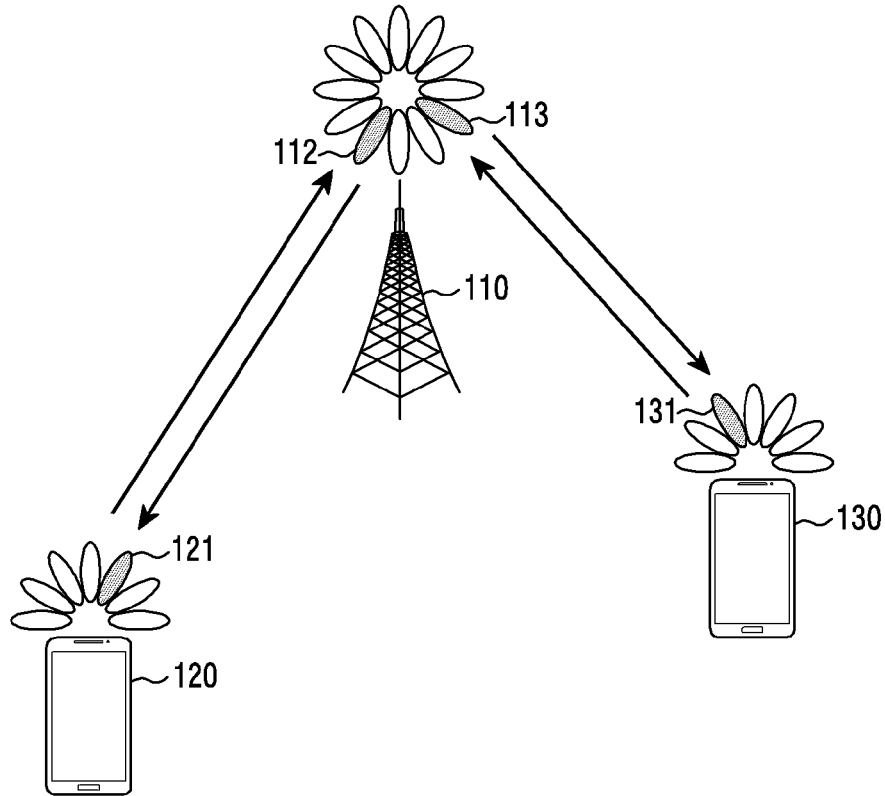
[Fig. 2]
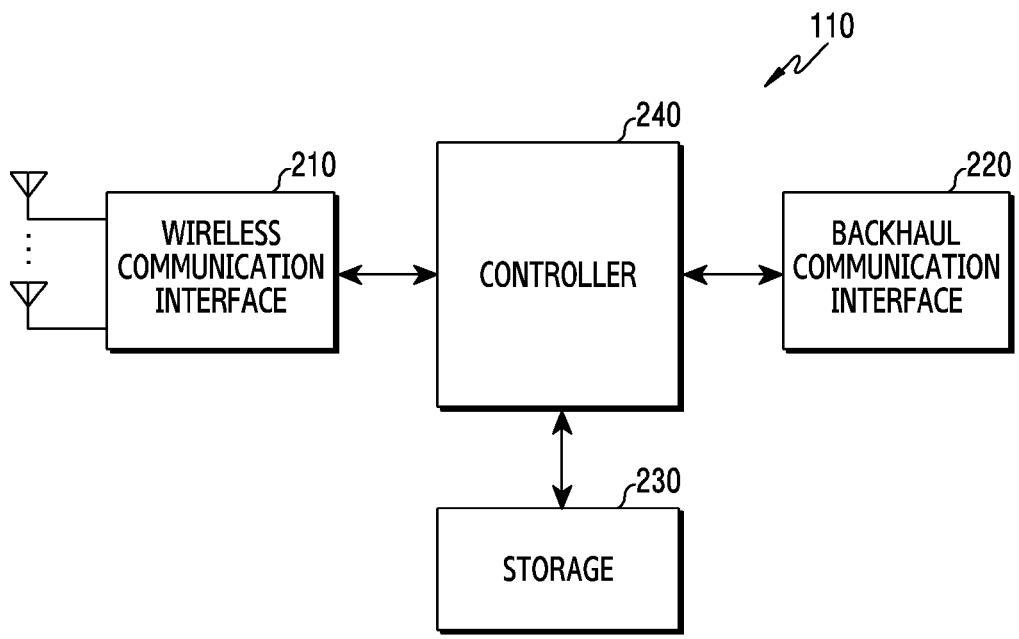

[Fig. 3]
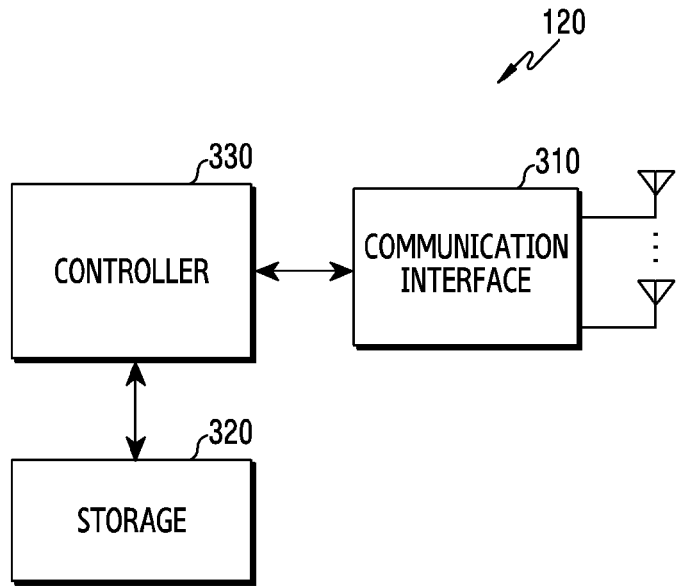
[Fig. 4]
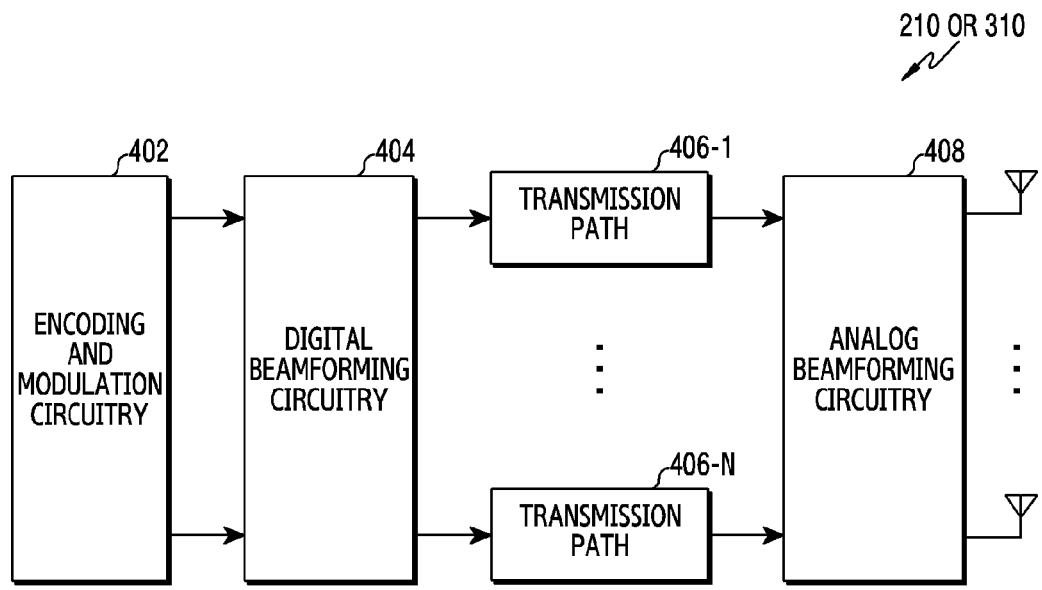

[Fig. 5]
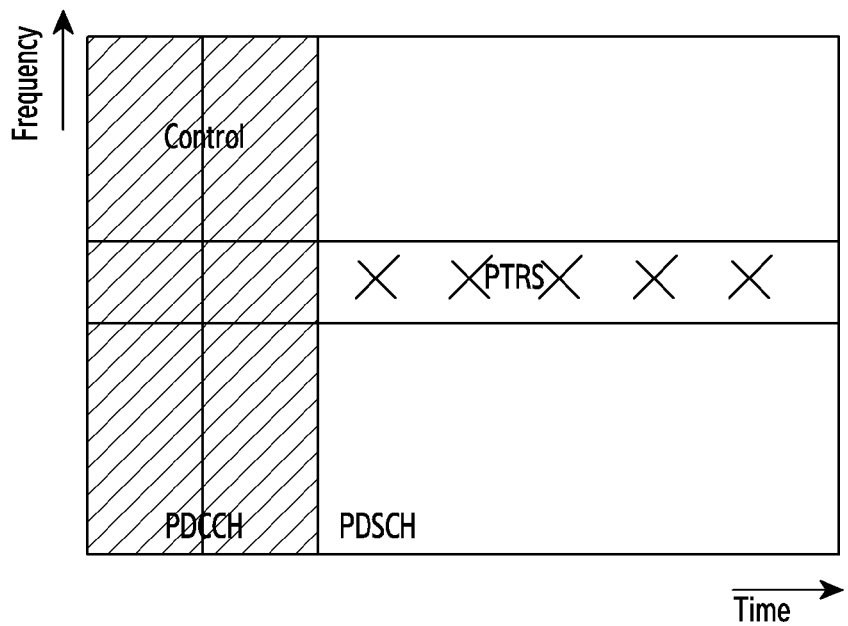
[Fig. 6]
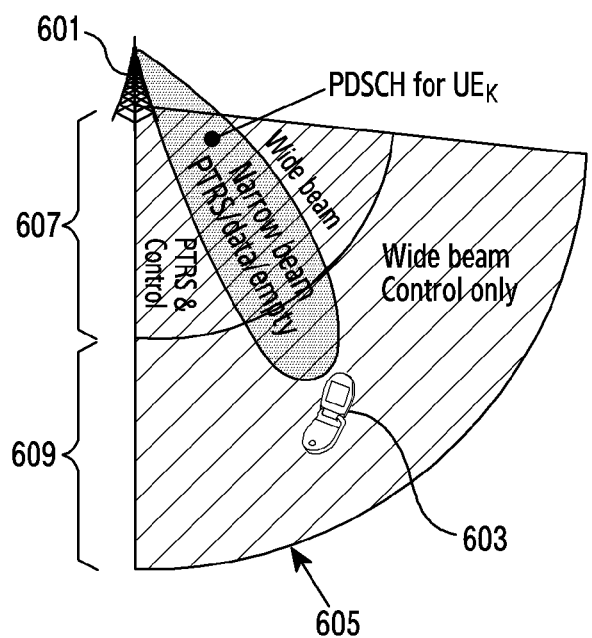

[Fig. 7]
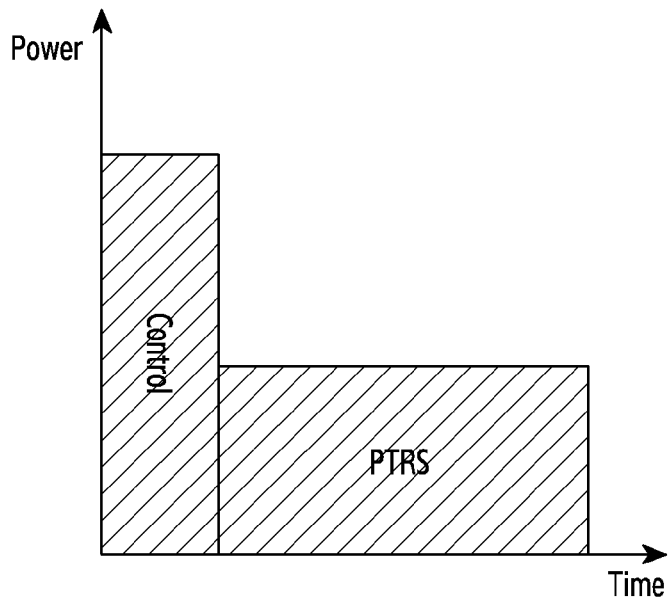
[Fig. 8]
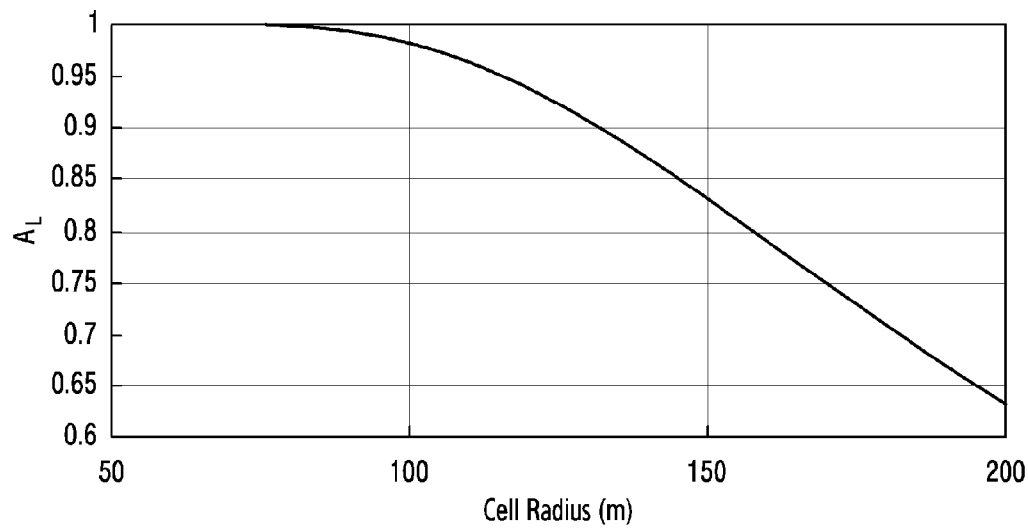

[Fig. 9]
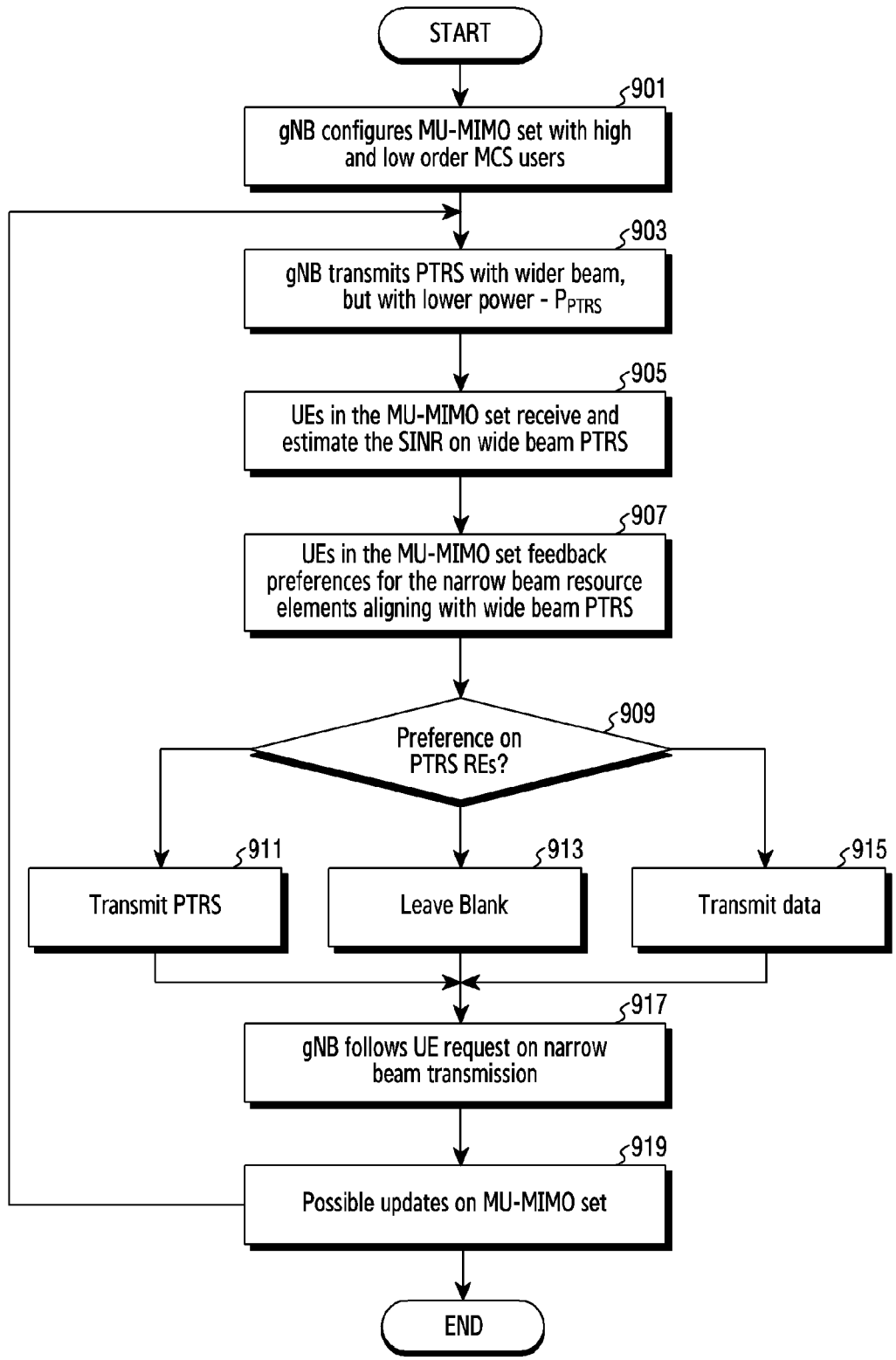

[Fig. 10]
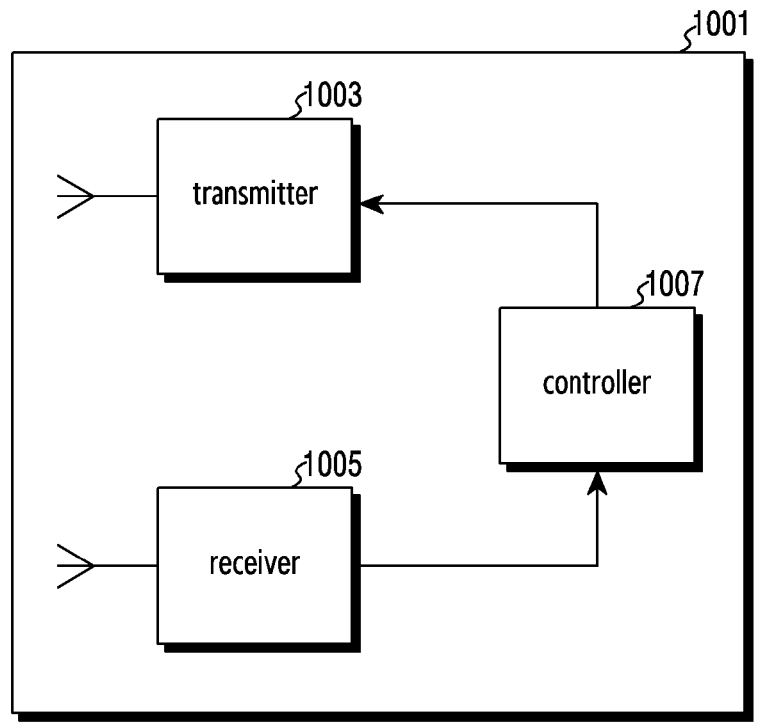
[Fig. 11]
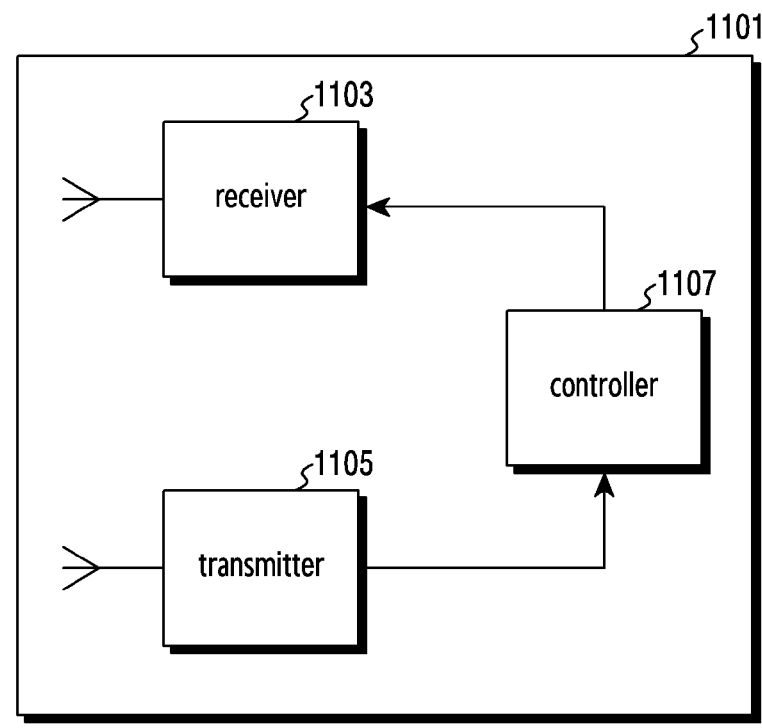

METHOD AND APPARATUS FOR PHASE TRACKING REFERENCE SIGNAL IN A WIRELESS COMMUNICATION SYSTEM

CROSS-REFERENCE TO RELATED APPLICATIONS

This application is a 371 of International Application No. PCT/KR2018/003328 filed on Mar. 22, 2018, which claims priority to United Kingdom Patent Application No. 1704731.7 filed on Mar. 24, 2017, the disclosures of which are herein incorporated by reference in their entirety.

BACKGROUND

1. Field

Certain embodiments of the present invention provide methods, apparatus and systems for providing a Phase Tracking Reference Signal (PTRS) for tracking a phase mismatch between transmitter and receiver side oscillators in a wireless communication system. For example, certain embodiments provide methods, apparatus and systems for providing a PTRS in millimetre wave communications in 3rd Generation Partnership Project (3GPP) 5th Generation (5G) New Radio (NR). Certain embodiments provide methods, apparatus and systems for providing a PTRS in the case of Multi-User (MU) Multiple-Input-Multiple-Output (MIMO).

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 28 GHz or 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In wireless communication systems, a phase mismatch between transmitter and receiver side oscillators, which may be referred to as Phase Noise (PN), results in a rotation of the constellation, potentially resulting in a reduction of transmission reliability (e.g. an increase in Bit Error Rate (BER)). In some systems, the most significant component of PN is rotation of the constellation by a common offset angle, which may be referred to as Common Phase Error (CPE). The problem of PN is typically greater for higher frequency communications, and can be a significant problem for millimetre (mm) wave communications (e.g. communication frequencies of approximately 6 GHz and above).

In order to deal with the effects of PN, some systems may transmit a reference signal (e.g. a Phase Tracking Reference Signal (PTRS)) between the transmitter side and the receiver side. The PTRS can be used to compensate for the effects of PN, if necessary. For example, a base station (e.g. a gNB in 3GPP 5G NR) may transmit a reference signal (e.g. a PTRS) to a mobile device (e.g. a User Equipment (UE)) in one or more allocated symbols (e.g. one or more Resource Elements (RE) in each Physical Resource Block (PRB)).

Providing a PTRS requires significant overhead since transmission resources (e.g. REs) are required to communicate the PTRS. Accordingly, what is desired is a technique for providing a PTRS in mm-wave communications in a manner that optimizes the use of transmission resources.

It is an aim of certain exemplary embodiments of the present invention to address, solve and/or mitigate, at least partly, at least one of the problems and/or disadvantages associated with the related art, for example at least one of the problems and/or disadvantages described above. It is an aim of certain exemplary embodiments of the present invention to provide at least one advantage over the related art, for example at least one of the advantages described below.

The present invention is defined in the independent claims. Advantageous features are defined in the dependent claims.

Other aspects, advantages, and salient features of the invention will become apparent to those skilled in the art from the following detailed description, which, taken in conjunction with the annexed drawings, disclose exemplary embodiments of the invention.

SUMMARY

According to exemplary embodiments of the present disclosure, a base station transmits, to a plurality of terminals, a phase tracking reference signal (PTRS) in a wide beam transmission based on a first power level. The first power level is set such that at least some of the plurality of terminals receive the PTRS with a first signal strength to enable the PTRS to be correctly received and such that at least some of the plurality of terminals receive the PTRS with a second signal strength to enable the PTRS to be processed as manageable interference.

According to exemplary embodiments of the present disclosure, a mobile device receives, from the base station, the PTRS in a wide beam transmission at a first power level. The first power level is set such that at least some of the mobile devices receive the PTRS with a sufficiently high signal strength to enable the PTRS to be correctly received and such that at least some of the mobile devices receive the PTRS with a sufficiently low signal strength to enable the PTRS to be processed as manageable interference.

According to exemplary embodiments of the present disclosure, a base station includes a transceiver and at least one processor operatively coupled with the transceiver. The at least one processor is configured to control to transmit, to a plurality of terminals, a phase tracking reference signal (PTRS) in a wide beam transmission based on a first power level. The first power level is set such that at least some of the plurality of terminals receive the PTRS with a first signal strength to enable the PTRS to be correctly received and such that at least some of the plurality of terminals receive the PTRS with a second signal strength to enable the PTRS to be processed as manageable interference.

According to exemplary embodiments of the present disclosure, a terminal includes a transceiver and at least one processor operatively coupled with the transceiver. The at least one processor is configured to control to receive, from a base station, a phase tracking reference signal (PTRS) in a wide beam transmission based on a first power level. The first power level is set such that at least some of a plurality of terminals receive the PTRS with a first signal strength to enable the PTRS to be correctly received and such that at least some of the plurality of terminals receive the PTRS with a second signal strength to enable the PTRS to be processed as manageable interference.

Various embodiments of the present disclosure provide an improved system performance.

BRIEF DESCRIPTION OF THE DRAWINGS

The above and other aspects, and features and advantages of certain exemplary embodiments and aspects of the present invention will be more apparent from the following detailed description when taken in conjunction with the accompanying drawings, in which:

FIG. 1 illustrates a wireless communication system according to various embodiments of the present disclosure;

FIG. 2 illustrates the BS in the wireless communication system according to various embodiments of the present disclosure;

FIG. 3 illustrates the terminal in the wireless communication system according to various embodiments of the present disclosure;

FIG. 4 illustrates the communication interface in the wireless communication system according to various embodiments of the present disclosure;

FIG. 5 illustrates an exemplary frame structure for transmitting information in an exemplary embodiment;

FIG. 6 illustrates an exemplary scenario in which a base station communicates with a mobile device in an exemplary embodiment;

FIG. 7 illustrates the power levels and timings of transmissions of a wide beam PDCCH and a wide beam PDSCH according to an exemplary embodiment;

FIG. 8 illustrates a LoS probability variation as a function of cell or sector radius in an exemplary embodiment;

FIG. 9 is a flow diagram of an exemplary method for providing a PTRS in an exemplary embodiment;

FIG. 10 is a schematic diagram of a mobile device according to exemplary embodiments; and FIG. 11 is a schematic diagram of a base station according to exemplary embodiments.

DETAILED DESCRIPTION

Hereinafter, in various embodiments of the present disclosure, hardware approaches will be described as an example. However, various embodiments of the present disclosure include a technology that uses both hardware and software and thus, the various embodiments of the present disclosure may not exclude the perspective of software.

Hereinafter, the present disclosure describes technology for phase tracking reference signal in a wireless communication system.

The terms referring a signal, the terms referring to a channel, the terms referring to control information, the terms referring to a network entity, and the terms referring to elements of a device used in the following description are used only for convenience of the description. Accordingly, the present disclosure is not limited to the following terms, and other terms having the same technical meaning may be used.

Further, although the present disclosure describes various embodiments based on the terms used in some communication standards (for example, 3rd Generation Partnership Project (3GPP)), they are only examples for the description. Various embodiments of the present disclosure may be easily modified and applied to other communication systems.

FIG. 1 illustrates a wireless communication system according to various embodiments of the present disclosure. In FIG. 1, a base station (BS) 110, a terminal 120, and a terminal 130 are illustrated as the part of nodes using a wireless channel in a wireless communication system. FIG. 1 illustrates only one BS, but another BS, which is the same as or similar to the BS 110, may be further included.

The BS 110 is network infrastructure that provides wireless access to the terminals 120 and 130. The BS 110 has coverage defined as a predetermined geographical region based on the distance at which a signal can be transmitted. The BS 110 may be referred to as "access point (AP)," "eNodeB (eNB)," "$5^{th}$ generation (5G) node," "wireless point," "transmission/reception Point (TRP)" as well as "base station."

Each of the terminals 120 and 130 is a device used by a user, and performs communication with the BS 110 through a wireless channel. Depending on the case, at least one of the terminals 120 and 130 may operate without user involvement. That is, at least one of the terminals 120 and 130 is a device that performs machine-type communication (MTC) and may not be carried by the user. Each of the terminals 120 and 130 may be referred to as "user equipment (UE)," "mobile station," "subscriber station," "remote terminal," "wireless terminal," or "user device" as well as "terminal."

The BS 110, the terminal 120, and the terminal 130 may transmit and receive wireless signals in millimeter wave (mmWave) bands (for example, 28 GHz, 30 GHz, 38 GHz, and 60 GHz). At this time, in order to improve a channel gain, the BS 110, the terminal 120, and the terminal 130 may perform beamforming. The beamforming may include transmission beamforming and reception beamforming. That is, the BS 110, the terminal 120, and the terminal 130 may assign directivity to a transmission signal and a reception signal. To this end, the BS 110 and the terminals 120 and 130 may select serving beams 112, 113, 121, and 131 through a beam search procedure or a beam management procedure. After that, communications may be performed using resources having a quasi co-located relationship with resources carrying the serving beams 112, 113, 121, and 131.

A first antenna port and a second antenna ports are considered to be quasi co-located if the large-scale properties of the channel over which a symbol on the first antenna port is conveyed can be inferred from the channel over which a symbol on the second antenna port is conveyed. The large-scale properties may include one or more of delay spread, doppler spread, doppler shift, average gain, average delay, and spatial Rx parameters.

FIG. 2 illustrates the BS in the wireless communication system according to various embodiments of the present disclosure. A structure exemplified at FIG. 2 may be understood as a structure of the BS 110. The term "-module", "-unit" or "-er" used hereinafter may refer to the unit for processing at least one function or operation and may be implemented in hardware, software, or a combination of hardware and software.

Referring to FIG. 2, the BS may include a wireless communication interface 210, a backhaul communication interface 220, a storage unit 230, and a controller 240.

The wireless communication interface 210 performs functions for transmitting and receiving signals through a wireless channel. For example, the wireless communication interface 210 may perform a function of conversion between a baseband signal and bitstreams according to a physical layer standard of the system. For example, in data transmission, the wireless communication interface 210 generates complex symbols by encoding and modulating transmission bitstreams. Further, in data reception, the wireless communication interface 210 reconstructs reception bitstreams by demodulating and decoding the baseband signal.

In addition, the wireless communication interface 210 up-converts the baseband signal into an Radio Frequency (RF) band signal, transmits the converted signal through an antenna, and then down-converts the RF band signal received through the antenna into the baseband signal. To this end, the wireless communication interface 210 may include a transmission filter, a reception filter, an amplifier, a mixer, an oscillator, a digital-to-analog convertor (DAC), an analog-to-digital convertor (ADC), and the like. Further, the wireless communication interface 210 may include a plurality of transmission/reception paths. In addition, the wireless communication interface 210 may include at least one antenna array consisting of a plurality of antenna elements.

On the hardware side, the wireless communication interface 210 may include a digital unit and an analog unit, and the analog unit may include a plurality of sub-units according to operation power, operation frequency, and the like. The digital unit may be implemented as at least one processor (e.g., a digital signal processor (DSP)).

The wireless communication interface 210 transmits and receives the signal as described above. Accordingly, the wireless communication interface 210 may be referred to as a "transmitter" a "receiver," or a "transceiver." Further, in the following description, transmission and reception performed through the wireless channel may be used to have a meaning including the processing performed by the wireless communication interface 210 as described above.

The backhaul communication interface 220 provides an interface for performing communication with other nodes within the network. That is, the backhaul communication interface 220 converts bitstreams transmitted to another node, for example, another access node, another BS, a higher node, or a core network, from the BS into a physical signal and converts the physical signal received from the other node into the bitstreams.

The storage unit 230 stores a basic program, an application, and data such as setting information for the operation of the BS 110. The storage unit 230 may include a volatile memory, a non-volatile memory, or a combination of volatile memory and non-volatile memory. Further, the storage unit 230 provides stored data in response to a request from the controller 240.

The controller 240 controls the general operation of the BS. For example, the controller 240 transmits and receives a signal through the wireless communication interface 210 or the backhaul communication interface 220. Further, the controller 240 records data in the storage unit 230 and reads the recorded data. The controller 240 may performs functions of a protocol stack that is required from a communication standard. According to another implementation, the protocol stack may be included in the wireless communication interface 210. To this end, the controller 240 may include at least one processor.

According to exemplary embodiments of the present disclosure, the controller 240 may transmit, to a plurality of terminals, a phase tracking reference signal (PTRS) in a wide beam transmission based on a first power level. In some embodiments, the first power level is set such that at least some of the plurality of terminals receive the PTRS with a first signal strength to enable the PTRS to be correctly received and such that at least some of the plurality of terminals receive the PTRS with a second signal strength to enable the PTRS to be processed as manageable interference.

According to exemplary embodiments of the present disclosure, the base station transmits, by the base station to the mobile devices, the PTRS in a wide beam transmission at a first power level, wherein the first power level is set such that at least some of the mobile devices receive the PTRS with a sufficiently high signal strength to enable the PTRS to be correctly received and such that at least some of the mobile devices receive the PTRS with a sufficiently low signal strength to enable the PTRS to be processed as manageable interference.

According to exemplary embodiments of the present disclosure, the cell or sector of the base station is divided into an inner area and an outer area. The mobile devices receive the PTRS with a sufficiently high signal strength to enable the PTRS to be correctly received comprise mobile devices located in the inner area. The mobile devices receive the PTRS with a sufficiently low signal strength to enable the PTRS to be processed as manageable interference comprise mobile devices located in the outer area.

According to exemplary embodiments of the present disclosure, each mobile device operates according to a first modulation scheme when the mobile device experiences a Signal to Interference plus Noise Ratio (SINR) above a threshold. Each mobile device operates according to a second modulation scheme when the mobile device experiences a SINR below a threshold. The first modulation scheme has a higher order than the second modulation scheme.

According to exemplary embodiments of the present disclosure, the PTRS is transmitted in one or more Resource Elements (REs) usually assigned to Physical Downlink Shared Channel (PDSCH). According to exemplary embodiments of the present disclosure, the base station transmits to the mobile devices, control signals in a wide beam transmission at a second power level. The second power level is higher than the first power level.

According to exemplary embodiments of the present disclosure, the control signals are transmitted in a Physical Downlink Control Channel. According to exemplary embodiments of the present disclosure, the first power level is one of: (i) a fixed value and (ii) a value adapted according to the propagation conditions of the sector.

According to exemplary embodiments of the present disclosure, a first mobile device estimates the SINR of the received PTRS and transmits to the base station, feedback information based on the estimated SINR.

According to exemplary embodiments of the present disclosure, the base station or the first mobile device determines whether a predetermined condition is satisfied based on the SINR estimated by the first mobile device. The base station transmits to the first mobile device, a narrow beam transmission comprising one or more allocated REs configured according to the determination or the feedback information.

According to exemplary embodiments of the present disclosure, the predetermined condition comprises one or more of: (i) the first mobile device operates according to a first modulation scheme, and the first mobile device receives the PTRS with a sufficiently high signal strength to enable the PTRS to be correctly received, (ii) the first mobile device operates according to the first modulation scheme, and the first mobile device does not receive the PTRS with a sufficiently high signal strength to enable the PTRS to be correctly received, (iii) the first mobile device operates according to a second modulation scheme, and the first mobile device receives the PTRS with a sufficiently low signal strength to enable the PTRF to be processed as manageable interference, and (iv) the first mobile device operates according to the second modulation scheme, and the first mobile device does not receive the PTRS with a sufficiently low signal strength to enable the PTRS to be processed as manageable interference. The first modulation scheme has a higher order than the second modulation scheme.

According to exemplary embodiments of the present disclosure, configuring the one or more allocated REs comprises one or more of the following: (a) if condition (i) or (iv) is satisfied, configuring the allocated REs to be left empty, carrying no information, (b) if condition (iii) is satisfied, configuring the allocated REs to contain data, and (c) if condition (ii) is satisfied, configuring the allocated REs to contain PTRS.

According to exemplary embodiments of the present disclosure, the wireless communication system operates according to a Multi-User (MU) Multiple-Input-Multiple-Output (MIMO) scheme. According to exemplary embodiments of the present disclosure, the base station configures an MU-MIMO set for co-scheduling a first set of mobile device that operates according to a first modulation scheme and a second set of devices that operate according to a second modulation scheme. The first modulation scheme has a higher order than the second modulation scheme.

According to exemplary embodiments of the present disclosure, the base station updates the MU-MIMO set. According to exemplary embodiments of the present disclosure, the base station transmits the PTRS in the wide beam transmission using Quadrature Phase Shift Keying (QPSK). According to exemplary embodiments of the present disclosure, the first modulation scheme is one of 64-Quadrature Amplitude Modulation (64-QAM), 256-QAM, and 1024-QAM. According to exemplary embodiments of the present disclosure, the wireless communication system comprises a wireless communication system operating at frequencies of 6 GHz or above.

According to exemplary embodiments of the present disclosure, the wireless communication system comprises a system according to 3rd Generation Partnership Project (3GPP) 5th Generation (5G) New Radio (NR). According to exemplary embodiments of the present disclosure, the base station is a gNB and the one or more mobile devices are User Equipment (UE).

According to exemplary embodiments of the present disclosure, a computer program comprises instructions which, when executed by a controller or processor of the base station, cause the controller or processor to implement an apparatus of the base station. According to exemplary embodiments of the present disclosure, a computer-readable storage medium stores the computer program. For example, the controller 240 may control the base station to perform operations according to the exemplary embodiments of the present disclosure.

FIG. 3 illustrates the terminal in the wireless communication system according to various embodiments of the present disclosure. A structure exemplified at FIG. 3 may be understood as a structure of the terminal 120 or the terminal 130. The term "-module", "-unit" or "-er" used hereinafter may refer to the unit for processing at least one function or operation, and may be implemented in hardware, software, or a combination of hardware and software.

Referring to FIG. 3, the terminal 120 includes a communication interface 310, a storage unit 320, and a controller 330.

The communication interface 310 performs functions for transmitting/receiving a signal through a wireless channel. For example, the communication interface 310 performs a function of conversion between a baseband signal and bitstreams according to the physical layer standard of the system. For example, in data transmission, the communication interface 310 generates complex symbols by encoding and modulating transmission bitstreams. Also, in data reception, the communication interface 310 reconstructs reception bitstreams by demodulating and decoding the baseband signal. In addition, the communication interface 310 up-converts the baseband signal into an RF band signal, transmits the converted signal through an antenna, and then down-converts the RF band signal received through the antenna into the baseband signal. For example, the communication interface 310 may include a transmission filter, a reception filter, an amplifier, a mixer, an oscillator, a DAC, and an ADC.

Further, the communication interface 310 may include a plurality of transmission/reception paths. In addition, the communication interface 310 may include at least one antenna array consisting of a plurality of antenna elements. In the hardware side, the wireless communication interface 210 may include a digital circuit and an analog circuit (for example, a radio frequency integrated circuit (RFIC)). The digital circuit and the analog circuit may be implemented as one package. The digital circuit may be implemented as at least one processor (e.g., a DSP). The communication interface 310 may include a plurality of RF chains. The communication interface 310 may perform beamforming.

The communication interface 310 transmits and receives the signal as described above. Accordingly, the communication interface 310 may be referred to as a "transmitter," a "receiver," or a "transceiver." Further, in the following description, transmission and reception performed through the wireless channel is used to have a meaning including the processing performed by the communication interface 310 as described above.

The storage unit 320 stores a basic program, an application, and data such as setting information for the operation of the terminal 120. The storage unit 320 may include a volatile memory, a non-volatile memory, or a combination of volatile memory and non-volatile memory. Further, the storage unit 320 provides stored data in response to a request from the controller 330.

The controller 330 controls the general operation of the terminal 120. For example, the controller 330 transmits and receives a signal through the communication interface 310. Further, the controller 330 records data in the storage unit 320 and reads the recorded data. The controller 330 may performs functions of a protocol stack that is required from a communication standard. According to another implementation, the protocol stack may be included in the communication interface 310. To this end, the controller 330 may include at least one processor or microprocessor, or may play the part of the processor. Further, the part of the communication interface 310 or the controller 330 may be referred to as a communication processor (CP).

According to exemplary embodiments of the present disclosure, the controller 330 may receive, from a base station, a phase tracking reference signal (PTRS) in a wide beam transmission based on a first power level. In some embodiments, the first power level is set such that at least some of a plurality of terminals receive the PTRS with a first signal strength to enable the PTRS to be correctly received and such that at least some of the plurality of terminals receive the PTRS with a second signal strength to enable the PTRS to be processed as manageable interference.

According to exemplary embodiments of the present disclosure, the mobile device receives, from the base station, the PTRS in a wide beam transmission at a first power level. The first power level is set such that at least some of the mobile devices receive the PTRS with a sufficiently high signal strength to enable the PTRS to be correctly received and such that at least some of the mobile devices receive the PTRS with a sufficiently low signal strength to enable the PTRS to be processed as manageable interference.

According to exemplary embodiments of the present disclosure, the mobile device operates the mobile device according to a first modulation scheme when the mobile device experiences a Signal to Interference plus Noise Ratio (SINR) above a threshold, and operate the mobile device according to a second modulation scheme when the mobile device experiences a SINR below a threshold. The first modulation scheme has a higher order than the second modulation scheme. According to exemplary embodiments of the present disclosure, the mobile station estimates the SINR of the received PTRS, and transmits, to the base station, feedback information based on the estimated SINR.

According to exemplary embodiments of the present disclosure, the feedback information comprises at least one of: the estimated SINR of the received PTRS, information indicating whether a predetermined condition is satisfied based on the estimated SINR of the received PTRS, the information being determined by the controller, and configuration information for configuring one or more allocated REs of a narrow beam transmission of the base station, the configuration information being determined by the controller based on the information indicating whether the predetermined condition is satisfied.

According to exemplary embodiments of the present disclosure, the mobile station receives, from the base station, the narrow beam transmission comprising the one or more allocated REs.

According to exemplary embodiments of the present disclosure, the predetermined condition comprises one or more of: (i) the first mobile device operates according to a first modulation scheme, and the first mobile device receives the PTRS with a sufficiently high signal strength to enable the PTRS to be correctly received, (ii) the first mobile device operates according to the first modulation scheme, and the first mobile device does not receive the PTRS with a sufficiently high signal strength to enable the PTRS to be correctly received, (iii) the first mobile device operates according to a second modulation scheme, and the first mobile device receives the PTRS with a sufficiently low signal strength to enable the PTRF to be processed as manageable interference, and (iv) the first mobile device operates according to the second modulation scheme, and the first mobile device does not receive the PTRS with a sufficiently low signal strength to enable the PTRS to be processed as manageable interference. The first modulation scheme has a higher order than the second modulation scheme.

According to exemplary embodiments of the present disclosure, the one or more allocated REs are configured according to one or more of the following: (a) if condition (i) or (iv) is satisfied, configure the allocated REs to be left empty, carrying no information, (b) if condition (iii) is satisfied, configure the allocated REs to contain data, and (c) if condition (ii) is satisfied, configure the allocated REs to contain PTRS.

According to exemplary embodiments of the present disclosure, a computer program comprises instructions which, when executed by a controller or processor of the mobile device, cause the controller or processor to implement an apparatus of the mobile device. According to exemplary embodiments of the present disclosure, a computer-readable storage medium stores the computer program. For example, the controller 330 may control the terminal to perform operations according to the exemplary embodiments of the present disclosure.

FIG. 4 illustrates the communication interface in the wireless communication system according to various embodiments of the present disclosure. FIG. 4 shows an example for the detailed configuration of the communication interface 210 of FIG. 2 or the communication interface 310 of FIG. 3. More specifically, FIG. 4 shows elements for performing beamforming as part of the communication interface 210 of FIG. 2 or the communication interface 310 of FIG. 3.

Referring to FIG. 4, the communication interface 210 or 310 includes an encoding and circuitry 402, a digital circuitry 404, a plurality of transmission paths 406-1 to 406-N, and an analog circuitry 408.

The encoding and circuitry 402 performs channel encoding. For the channel encoding, at least one of a low-density parity check (LDPC) code, a convolution code, and a polar code may be used. The encoding and circuitry 402 generates modulation symbols by performing constellation mapping.

The digital circuitry 404 performs beamforming for a digital signal (for example, modulation symbols). To this end, the digital circuitry 404 multiples the modulation symbols by beamforming weighted values. The beamforming weighted values may be used for changing the size and phrase of the signal, and may be referred to as a "precoding matrix" or a "precoder." The digital circuitry 404 outputs the digitally beamformed modulation symbols to the plurality of transmission paths 406-1 to 406-N. At this time, according to a multiple input multiple output (MIMO) transmission scheme, the modulation symbols may be multiplexed, or the same modulation symbols may be provided to the plurality of transmission paths 406-1 to 406-N.

The plurality of transmission paths 406-1 to 406-N convert the digitally beamformed digital signals into analog signals. To this end, each of the plurality of transmission paths 406-1 to 406-N may include an inverse fast Fourier transform (IFFT) calculation unit, a cyclic prefix (CP) insertion unit, a DAC, and an up-conversion unit. The CP insertion unit is for an orthogonal frequency division multiplexing (OFDM) scheme, and may be omitted when another physical layer scheme (for example, a filter bank multi-carrier: FBMC) is applied. That is, the plurality of transmission paths 406-1 to 406-N provide independent signal processing processes for a plurality of streams generated through the digital beamforming. However, depending on the implementation, some of the elements of the plurality of transmission paths 406-1 to 406-N may be used in common.

The analog circuitry 408 performs beamforming for analog signals. To this end, the digital circuitry 404 multiples the analog signals by beamforming weighted values. The beamformed weighted values are used for changing the size and phrase of the signal. More specifically, according to a connection structure between the plurality of transmission paths 406-1 to 406-N and antennas, the analog circuitry 408 may be configured in various ways. For example, each of the plurality of transmission paths 406-1 to 406-N may be connected to one antenna array. In another example, the plurality of transmission paths 406-1 to 406-N may be connected to one antenna array. In still another example, the plurality of transmission paths 406-1 to 406-N may be adaptively connected to one antenna array, or may be connected to two or more antenna arrays.

Certain embodiments of the present invention provide methods, apparatus and systems for providing a Phase Tracking Reference Signal (PTRS) for tracking a phase mismatch between transmitter and receiver side oscillators in a wireless communication system. For example, certain embodiments provide methods, apparatus and systems for providing a PTRS in mm-wave communications in 3GPP 5G NR. Certain embodiments provide methods, apparatus and systems for providing a PTRS in the case that a MIMO scheme is applied. However, the skilled person will appreciate that the present invention is not limited to these examples, and may be applied in any suitable system or standard, for example one or more existing and/or future generation wireless communication systems or standards.

As mentioned above, PN rotates the constellations of data symbols, which can result in a reduction of reception reliability. The problem of PN becomes significant for mm-wave communications. Accordingly, certain embodiments of the present invention provide a technique for providing a PTRS when using mm-wave communications.

In addition, PN becomes significant when using a relatively high-order modulation scheme, for example 64-Quadrature Amplitude Modulation (64-QAM) and higher, due to the relatively high density of the constellation points compared to lower-order modulation schemes. On the other hand, PN may not be detrimental to communications when using a relatively low-order modulation scheme, for example 16-QAM, due to the relatively low density of the constellation points. Accordingly, certain embodiments of the present invention provide a technique in which a PTRS may be provided for mobile devices (e.g. UE) that use a relatively high-order modulation scheme, for example 64-QAM and higher, and which do not need to provide a PTRS for those mobile devices that use a relatively low-order modulation scheme, for example below 64-QAM, thereby improving the efficiency of transmission resources.

As mentioned above, the largest component of PN is typically Common Phase Error (CPE), which rotates the constellation by a common offset. Accordingly, in certain embodiments of the present invention, the PTRS may be provided for compensating for the effects of CPE.

As described in greater detail below, certain exemplary embodiments provide a technique for providing a PTRS in a wireless communication system. An exemplary method comprises transmitting, by a base station to a plurality of mobile devices, the PTRS in a wide beam transmission at a first power level. The first power level is set such that at least some of the mobile devices receive the PTRS with a sufficiently high signal strength to enable the PTRS to be correctly received and such that at least some of the mobile devices receive the PTRS with a sufficiently low signal strength to enable the PTRS to be processed as manageable interference. A first mobile device may estimate the Signal to Interference plus Noise Ratio (SINR) of the received PTRS, and transmit, to the base station, feedback information based on the estimated SINR. The base station may transmit, to the first mobile device, a narrow beam transmission comprising one or more allocated Resource Elements (REs) configured according to the feedback information. The allocated REs may be configured to (i) be left empty, so as to carry no information, (ii) contain data, or (iii) contain PTRS.

The skilled person will appreciate that the present invention is not limited to the use of Signal to Noise Ratio (SNR) or SINR, and that any other suitable measure of relative or absolute signal strength, quality or reliability may be used. All references herein to SNR or SINR may be understood to include any other such suitable measure.

FIG. 5 illustrates an exemplary frame structure for transmitting information in an exemplary embodiment of the present invention. In this example, the frame structure is used for certain Downlink (DL) Physical Layer channels, in particular a Physical Downlink Shared Channel (PDSCH) and a Physical Downlink Control Channel (PDCCH) for transmitting information (e.g. control signals and data) from a base station (e.g. gNB) to one or more mobile devices (e.g. UEs).

The frame comprises a number of Orthogonal Frequency Division Multiplexing (OFDM) symbols, each OFDM symbol comprising a number of subcarriers. Each subcarrier of each symbol may be referred to as a Resource Element (RE). The symbols may be thought of as forming a grid of REs with time along one axis of the grid (the horizontal axis in FIG. 5) and frequency along the other axis of the grid (the vertical axis in FIG. 5). A block of REs comprising a number (e.g. 12) of adjacent subcarriers in a number (e.g. 7) of consecutive symbols may be defined as a Physical Resource Block (PRB). The frame is divided into a number of consecutive symbols forming the PDCCH and a number of consecutive symbols forming the PDSCH.

FIG. 6 illustrates an exemplary scenario in which a base station 601 (e.g. gNB, base station 110) communicates with a mobile device 603 (e.g. UE, terminal 120, terminal 130). The coverage area (or cell) of the base station 601 may comprise one or more sectors. If there is only one sector, then that sector corresponds to the cell. In the example illustrated in FIG. 6, the coverage area of the base station 601 is divided into multiple sectors 605, one of which is illustrated. The sector 605 can be further divided into an inner-sector area 607 and an outer-sector area 209. In FIG. 6, the mobile device 603 is located in the outer-sector area 609 of the sector 605.

If a mobile device 603 is located relatively close to the base station 601 (e.g. in the inner-sector area 607), the receive signal strength for a given transmission power will be greater than for a mobile device 603 located relatively far from the base station 601 (e.g. in the outer-sector area 609) due to the distance dependant increase in the path loss suffered by transmissions from the base station 601.

Accordingly, mobile devices 603 located relatively far from the base station 601 (e.g. those located in the outer-sector area 609) may apply a modulation and coding scheme (MCS) for data transmission using a relatively low-order modulation scheme, for example below 64-QAM (e.g. 16-QAM and QPSK). This is because low-order modulation schemes are relatively robust when the receive signal strength is relatively low, but provide a relatively low data rate. Mobile devices 603 using a relatively low-order modulation scheme for data transmission may be referred to as low-order (or lower-order) MCS devices.

On the other hand, mobile devices 603 located relatively close to the base station 601 (e.g. those located in the inner-sector area 607) may apply an MCS for data transmission using a relatively high-order modulation scheme, for example 64-QAM and above (e.g. 64-QAM, 256-QAM or 1024-QAM). High-order modulation schemes provide a relatively high data rate but are less robust when the receive signal strength is low. Mobile devices 603 using a relatively high-order modulation scheme for data transmission may be referred to as high-order (or higher-order) MCS devices.

In certain embodiments, a mobile device 603 may use a first modulation scheme (i.e. a relatively high-order modulation scheme) for data transmission when the mobile device 603 experiences a relatively high SINR (e.g. a SINR above a first threshold), and may use a second modulation scheme (i.e. a relatively low-order modulation scheme) for data transmission when the mobile device 603 experiences a relatively low SINR (e.g. a SINR below a second threshold, which may be the same as or different from the first threshold). A mobile device 603 may monitor the experienced SINR and adjust the modulation scheme accordingly. According to this scheme, mobile devices 603 using a relatively high-order modulation scheme will tend to be located in the inner-sector area 607, and mobile devices 603 using a relatively low-order modulation scheme will tend to be located in the outer-sector area 609.

In the exemplary embodiment described herein, a millimetre wave transmission scheme may be applied. Millimetre wave transmissions typically suffer greater path loss, so to combat that and provide a higher SNR or SINR, narrow beam transmissions targeting particular mobile devices (users) 603 may be used. However for common control channels to all users in a cell or sector 605, wide beam transmissions, even with a lower carrier frequency may be needed.

According to this scheme, signals may be transmitted from the base station 601 to mobile devices 603 through (i) a wide beam covering an entire sector 605 such that multiple mobile devices 603 within the sector 605 receive the wide beam signal, or (ii) a narrow beam that is directed towards a specific mobile 603 device within the sector 605. Signals received by a mobile device 603 through a wide beam are typically received with a lower power (and hence a lower SINR) than signals received through a narrow beam. FIG. 6 illustrates a wide beam transmission and a narrow beam transmission.

Also in certain embodiments, an MU-MIMO configuration may be used. In MU-MIMO, multiple (physically separate) mobile devices (user devices) 603 are treated as a MIMO configuration and the same radio resources can be used for them through spatial multiplexing techniques, for example as described in C. Lim, T. Yoo, B. Clerckx, B. Lee, B. Shim, "Recent Trend of Multi-user MIMO in LTE Advanced", IEEE Communications Magazine, Vol. 51, Issue 3, March 2013. An MU-MIMO set can contain high-order and low-order MCS devices. As described above, only high-order MCS devices may require PTRS. Accordingly, certain embodiments of the present invention may provide PTRS only to the high-order MCS devices and allow the low-order MCS devices the option to multiplex data transmissions in these REs.

In embodiments of the present invention, PTRS symbols may be transmitted through a wide beam. For example, in certain embodiments, PTRS symbols may be transmitted through a wide beam, using PDSCH REs (for example, one or more REs usually assigned to PDSCH) as reference signals. In certain embodiments, the PTRS symbols may be transmitted with a lower power than control symbols transmitted through a wide beam PDCCH. The PTRS symbols may be transmitted using a relatively low-order modulation scheme, for example Quadrature Phase Shift Keying (QPSK), that is capable of achieving sufficient reliability of reception of the PTRS symbols.

FIG. 7 illustrates the power levels and timings of the transmissions of the wide beam PDCCH and the wide beam PTRS according to the above scheme. The REs used to transmit the wide beam PDCCH and the wide beam PTRS are indicated in the frame structure illustrated in FIG. 5, and the coverage areas of the wide beam PDCCH and the wide beam PTRS are indicated in FIG. 6.

In more detail, as illustrated in FIG. 7, control symbols may be transmitted in a wide beam PDCCH during a first time slot with a first power level $P_{control}$. The first power level may be set such that all mobile devices 603 within the sector 605 covered by the wide beam transmission receive the control symbols with sufficiently high reliability to be able to decode them. The first power level may be a fixed value. Alternatively, the first power level may be adapted, for example according to the propagation conditions of a cell or sector 605.

In addition, as illustrated in FIG. 7, the PTRS (e.g. PTRS symbols) may be transmitted in a wide beam during a second time slot following the first time slot with a second power level $P_{PTRS}$. In this example, the second power level is lower than the first power level $P_{PTRS} < P_{control}$. The second power level may be set such that mobile devices 603 located relatively close to the base station 601 (e.g. those within the inner-sector area 607) receive the PTRS symbols with sufficiently high reliability to decode them. Even though the PTRS symbols are transmitted with the second power that is lower than the first power, sufficient reliability of reception within the inner-sector area 607 may be achieved, for example, by transmitting the PTRS symbols with a sufficiently low-order modulation scheme, for example QPSK. The second power level may be a fixed value. Alternatively, the second power level may be adapted, for example according to the propagation conditions of a cell or sector 605.

On the other hand, mobile devices 603 located relatively far from the base station 601 (e.g. those within the outer-sector area 609) may not receive the PTRS symbols with sufficient reliability to decode them. However, this does not matter since the mobile devices 603 located in the outer-sector area 609 typically use a relatively low-order modulation scheme for data transmission (i.e. they are low-order MCS devices, as described above). Hence these mobile devices 603 do not need to decode the PTRS symbols since such low-order modulation schemes are robust to PN.

In this case, low-order MCS devices (typically located in the outer-sector area 609) may treat the PTRS as interference. Furthermore, due to the relatively low level of the second power level, the interference level of the PTRS may be manageable. That is, a mobile device 603 may apply one or more suitable schemes (e.g. error correction) to correctly decode other signals or symbols that are subject to the interference of the PTRS.

In the system described above, there may be some high-order MCS devices that do not receive the required PTRS symbols with sufficient reliability to decode them. In addition, there may be some low-order MCS devices that receive the PTRS symbols as interference at a relatively high interference level. For example, these scenarios may be caused by local fading conditions. Also, there may be some high-order MCS devices actually located within the outer-sector area 609 where the receive strength of the PTRS symbols is too low, and conversely there may be some low-order MCS devices actually located within the inner-sector area 607 where the receive strength of the PTRS symbols is too high.

To mitigate this problem, certain embodiments of the present invention may provide a technique in which a mobile device 603 may provide feedback to the base station 601, and the base station 601 configures a further transmission, in the form of a narrow beam transmission, accordingly. The narrow beam transmission is a directional Line of Sight (LoS) transmission steered in the direction of a particular mobile device 603.

FIG. 8 illustrates the LoS probability variation as a function of the cell or sector radius. As shown in FIG. 8, the LoS probability steadily decays as a function of the cell or sector radius. The narrow beam transmission may include one or more REs or symbols which may be selectively filled with PTRS or data according to the feedback.

In an exemplary embodiment, the following scenarios may occur:

A high-order MCS device receives the PTRS symbols with sufficient reliability to decode them.

A high-order MSC device does not receive the PTRS symbols with sufficient reliability to decode them.

A low-order MCS device receives the PTRS symbols as interference at a level that is manageable.

A low-order MCS device receives the PTRS symbols as interference at a level that is not manageable.

Certain allocated REs within the narrow beam transmission, which may overlap with the wide beam PTRS, may be configured as follows:

The allocated REs may be left empty, carrying no information.

The allocated REs may contain data.

The allocated REs may contain PTRS.

In certain embodiments, configuration A may be set as a result of scenarios 1 and 4, configuration B may be set as a result of scenario 3, and configuration C may be set as a result of scenario 2.

In more detail, if a high-order MCS device receives the PTRS through the wide beam transmission with sufficiently high reliability to decode them, then there is no need to provide the PTRS symbols through the additional narrow beam transmission.

If a high-order MSC device does not receive the PTRS through the wide beam transmission with sufficiently high reliability to decode them, then the allocated of the narrow beam transmission may be used to transmit the PTRS so that the high-order MSC device can correctly decode them. In particular, the PTRS transmitted through the narrow beam will have a relatively high effective Equivalent Isotropically Radiated Power (EIRP) and will be received with greater reliability than the PTRS transmitted through the wide beam transmission.

If a low-order MCS device receives the PTRS as interference at a level that is manageable, then the allocated REs of the narrow beam transmission may be used to transmit data or other information. This is because such data or information may be reliably received despite the interference caused by the PTRS in the wide beam transmission.

If a low-order MCS device receives the PTRS symbols through the wide beam transmission as interference at a level that is not manageable, then the allocated REs of the narrow beam transmission are left empty. This is because any information carried by these REs are unlike to be reliably received due to the unmanageable interference caused by the PTRS in the wide beam transmission.

Accordingly, each mobile device 603 may transmit suitable feedback to the base station 601. For example, each mobile device 603 may estimate the SINR of the PTRS in the wide beam transmission and feed this information back to the base station 601. Alternatively, each mobile device 603 may determine a desired configuration for the narrow beam transmission and feedback this preference to the base station 601. Based on the feedback information received from the mobile devices 603, the base station 601 configures the narrow beam transmission accordingly.

The base station 601 may use the feedback information as an input to user scheduling into a MU-MIMO set. In certain embodiments, the base station 601 may co-schedule a number of high-order MCS devices who would benefit from the wide beam PTRS transmissions and a few low-order MCS devices who can use these same resource spaces for the narrow beam data transmissions, while not interfering with the PTRS transmissions for the high-order MCS device sub-set. This kind of scheduling can increase the overall system spectral efficiency, as the same REs can be used for PTRS (for the high-order MCS subset) and for data transmissions (for the low-order MCS subset).

As described above, the feedback procedure may be regarded as comprising operations, including (i) estimating the SINR of the PTRS received by a mobile device 603, (ii) determining whether one or more predetermined conditions are satisfied based on the estimated SINR, and (iii) determining a configuration of one or more allocated REs of a narrow beam transmission of the base station 601. Operation (i) is carried out by the mobile device 603. Operation (ii) may be carried out by either the mobile device 603 or the base station 601. Operation (iii) may also be carried out by either the mobile device 603 or the base station 601.

Accordingly, depending on which entity carries out operations (ii) and (iii) above, the feedback information may comprise different information. For example, the feedback information may comprise at least one of (a) the estimated SINR of the received PTRS (e.g. if operations (ii) and (iii) are carried out by the base station 601), (b) information indicating whether the one or more predetermined conditions are satisfied (e.g. if operation (ii) is carried out by the mobile device 603 and operation (iii) is carried out by the base station 601), and (c) configuration information for configuring the one or more allocated REs of the narrow beam transmission (if operations (ii) and (iii) are carried out by the mobile device 603).

FIG. 9 is a flow diagram of an exemplary method for providing a PTRS in an exemplary embodiment.

In a first step 901, the base station (e.g. gNB) 601 configures a MU-MIMO set with high-order MCS devices (e.g. UEs) and low-order MCS users (e.g. UEs) 603.

In a next step 903, the base station 601 transmits a wide beam containing the PTRS with a relatively low power (e.g. the second power, $P_{PTRS}$ described above).

In a next step 905, the mobile devices 603 in the MU-MIMO set receive the wide beam transmission containing the PTRS and estimate the SINR of the wide beam PTRS.

In a next step 907, the mobile devices 603 in the MU-MIMO set feedback preferences for the narrow beam REs aligning with the wide beam PTRS transmission.

In a next step 909, the base station 601 receives the feedback information from the mobile devices 603. As described above, the base station 601 may transmit PTRS in allocated resources of the narrow beam transmission in step 911, leave the allocated resources in the narrow beam transmission blank 913, or insert data into the allocated REs in step 915.

In a next step 917, the base station 601 configures narrow beam transmissions according to the preference of the mobile devices 603 and transmits the narrow beam signal.

In a next step 919, the base station 601 determines whether an update on the MU-MIMO set is required, and if an update is required, the base station 601 updates the MU-MIMO set. The method then returns to step 903.

Certain embodiments of the present invention may be provided in the form of a base station and/or method therefor. Certain embodiments of the present invention may be provided in the form of a mobile device and/or method therefor. Certain embodiments of the present invention may be provided in the form of a system comprising a base station and a plurality of mobile devices and/or method therefor.

The techniques described herein may be implemented using any suitably configured apparatus and/or system. Such an apparatus and/or system may be configured to perform a method according to any aspect, embodiment, example or claim disclosed herein. Such an apparatus may comprise one or more elements, for example one or more of receivers, transmitters, transceivers, processors, controllers, modules, units, and the like, each element configured to perform one or more corresponding processes, operations and/or method steps for implementing the techniques described herein. For example, an operation of X may be performed by a module configured to perform X (or an X-module). The one or more elements may be implemented in the form of hardware, software, or any combination of hardware and software.

FIG. 10 is a schematic diagram of a base station according to an exemplary embodiment.

The base station 1001 (e.g. corresponding to the base station 601 of FIG. 6) comprises a transmitter 1003 for transmitting signals to a mobile device (e.g. corresponding to a mobile device 603 of FIG. 6). In particular, the transmitter 1003 may be configured for transmitting PTRS to one or more mobile devices 603, for example as described above. The transmitter 1003 may be configured for transmitting signals according to mm-wave communications, for example as described above. The transmitter 1003 may be configured for transmitting a wide beam signal, for example as described above. The transmitter 1003 may be configured for transmitting a narrow beam signal, for example as described above. The transmitter 1003 may be configured for transmitting signals according to one or more modulation schemes, for example as described above. The transmitter 1003 may be configured for transmitting signals according to an MU-MIMO scheme, for example as described above.

The base station 1001 also comprises a receiver 1005 for receiving signals from the mobile devices 603. In particular, the receiver 1005 may be configured for receiving feedback information from the mobile devices 603, for example as described above.

The transmitter 1003 and the receiver 1005 may be provided in any suitable configuration, for example as one or more transmitters (or an array thereof) and one or more receivers (or an array thereof) provided separately, or as one or more transceivers (or an array thereof).

The base station 1001 also comprises a controller or processor 1007 configured for executing, performing and/or controlling various operations, processes and/or method step, for example some or all the operations described above in relation to the base station 1001, 601 (e.g. steps 901, 903 and 909-919 described above in relation to FIG. 9), required for operation of the base station 1001, 601 according to any embodiment, aspect, example and/or claim disclosed herein.

FIG. 11 is a schematic diagram of a mobile device according to an exemplary embodiment.

The mobile device 1101 (e.g. corresponding to a mobile device 603 of FIG. 6) comprises a receiver 1103 for receiving signals from a base station (e.g. corresponding to the base station 601 of FIG. 6). In particular, the receiver 1103 may be configured for receiving PTRS from the base station 601, for example as described above. The receiver 1103 may be configured for receiving signals according to mm-wave communications, for example as described above. The receiver 1103 may be configured for receiving a wide beam signal, for example as described above. The receiver 1103 may be configured for receiving a narrow beam signal, for example as described above. The receiver 1103 may be configured for receiving signals according to one or more modulation schemes, for example as described above. The receiver 1103 may be configured for receiving signals according to an MU-MIMO scheme, for example as described above.

The mobile device 1101 also comprises a transmitter 1105 for transmitting signals to the base station 601. In particular, the transmitter 1105 may be configured for transmitting feedback information to the base station 601, for example as described above.

The receiver 1103 and the transmitter 1105 may be provided in any suitable configuration, for example as one or more receivers (or an array thereof) and one or more transmitters (or an array thereof) provided separately, or as one or more transceivers (or an array thereof).

The mobile device 1101 also comprises a controller or processor 1107 configured for executing, performing and/or controlling various operations, processes and/or method steps, for example some or all the operations described above in relation to a mobile device 1101, 603 (e.g. steps 905 and 907 described above in relation to FIG. 9), required for operation of the mobile device 1101, 603 according to any embodiment, aspect, example and/or claim disclosed herein.

Methods according to embodiments stated in claims and/or specifications of the present disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

Although the present disclosure has been described with an exemplary embodiment, various changes and modifications may be suggested to one skilled in the art. It is intended that the present disclosure encompass such changes and modifications as fall within the scope of the appended claims.

The invention claimed is:

1. A base station in a wireless communication system, wherein the wireless communication system operates according to a multi-user (MU) multiple-input-multiple-output (MIMO) scheme, the base station comprising:
   a transceiver; and
   at least one processor operatively coupled with the transceiver, and configured to:
      transmit, to a plurality of terminals, a phase tracking reference signal (PTRS) in a wide beam transmission using a quadrature phase shift keying (QPSK) and based on a first power level, and
      transmit, to the plurality of terminals, control signals in a wide beam transmission based on a second power level, wherein the second power level is higher than the first power level,
   wherein the first power level is set such that at least some of the plurality of terminals receive the PTRS with a first signal strength to enable the PTRS to be correctly received and such that at least some of the plurality of terminals receive the PTRS with a second signal strength to enable the PTRS to be processed as manageable interference.

2. The base station of claim 1, wherein the PTRS is transmitted in one or more resource elements (REs) usually assigned to physical downlink shared channel (PDSCH).

3. The base station of claim 1, wherein the control signals are transmitted in a physical downlink control channel (PDCCH).

4. The base station of claim 1, wherein the first power level is at least one of a fixed value and a value adapted according to propagation conditions of the sector.

5. The base station of claim 1, wherein the at least one processor is further configured to control to:
   determine whether a predetermined condition is satisfied based on a signal to interference plus noise ratio (SINR) estimated by one of the plurality of terminals; and
   transmit, to one of the plurality of terminals, a narrow beam transmission comprising one or more resource elements (REs) configured according to the determination.

6. The base station of claim 5, wherein the at least one processor is further configured to one or more of:
   configure the one or more REs to be left empty, carrying no information,
   configure the one or more REs to contain data, and
   configure the one or more REs to contain PTRS.

7. The base station of claim 1, wherein the at least one processor is further configured to control to configure an MU-MIMO set for co-scheduling a first set of the plurality of terminals that operates according to a first modulation scheme and a second set of the plurality of terminals that operate according to a second modulation scheme,
   wherein the first modulation scheme has a higher order than the second modulation scheme.

8. A terminal in a wireless communication system, wherein the wireless communication system operates according to a multi-user (MU) multiple-input-multiple-output (MIMO) scheme, the terminal comprising:
   a transceiver; and
   at least one processor operatively coupled with the transceiver, and configured to:
      receive, from a base station, a phase tracking reference signal (PTRS) in a wide beam transmission using a quadrature phase shift keying (QPSK) and based on a first power level, and
      receive, from a base station, control signals in a wide beam transmission based on a second power level, wherein the second power level is higher than the first power level,
   wherein the first power level is set such that at least some of a plurality of terminals receive the PTRS with a first signal strength to enable the PTRS to be correctly received and such that at least some of the plurality of terminals receive the PTRS with a second signal strength to enable the PTRS to be processed as manageable interference.

9. The terminal of claim 8, wherein the at least one processor is configured to control to operate the terminal according to a first modulation scheme if the terminal experiences a signal to interference plus noise ratio (SINR) above a threshold, and operate the terminal according to a second modulation scheme if the terminal experiences a SINR below a threshold, and
   wherein the first modulation scheme has a higher order than the second modulation scheme.

10. The terminal of claim 8, wherein the at least one processor is configured to:
   estimate a signal to interference plus noise ratio (SINR) of the received PTRS, and
   transmit, to the base station, feedback information based on the estimated SINR.

11. The terminal of claim 10, wherein the feedback information comprises at least one of:
   the estimated SINR of the received PTRS,
   information indicating whether a predetermined condition is satisfied based on the estimated SINR of the received PTRS, and
   configuration information for configuring one or more allocated resource elements (REs) of a narrow beam transmission of the base station, the configuration information being determined based on the information indicating whether the predetermined condition is satisfied.

12. A method for operating a base station in a wireless communication system, wherein the wireless communication system operates according to a multi-user (MU) multiple-input-multiple-output (MIMO) scheme, the method comprising:

transmitting, to a plurality of terminals, a phase tracking reference signal (PTRS) in a wide beam transmission using a quadrature phase shift keying (QPSK) and based on a first power level; and transmitting, to the plurality of terminals, control signals in a wide beam transmission based on a second power level, wherein the second power level is higher than the first power level, wherein the first power level is set such that at least some of the plurality of terminals receive the PTRS with a first signal strength to enable the PTRS to be correctly received and such that at least some of the plurality of terminals receive the PTRS with a second signal strength to enable the PTRS to be processed as manageable interference.

13. The method of claim 12, wherein the PTRS is transmitted in one or more resource elements (REs) usually assigned to physical downlink shared channel (PDSCH).

14. The method of claim 12, wherein the control signals are transmitted in a physical downlink control channel (PDCCH).

15. The method of claim 12, wherein the first power level is at least one of a fixed value and a value adapted according to propagation conditions of the sector.

16. The method of claim 12, further comprising:

determining whether a predetermined condition is satisfied based on a signal to interference plus noise ratio (SINR) estimated by one of the plurality of terminals; and transmitting, to one of the plurality of terminals, a narrow beam transmission comprising one or more resource elements (REs) configured according to the determination.

17. The method of claim 16, further comprising one or more of:

configuring the one or more REs to be left empty, carrying no information, configuring the one or more REs to contain data, and configuring the one or more REs to contain PTRS.

* * * * *

UNITED STATES PATENT AND TRADEMARK OFFICE
CERTIFICATE OF CORRECTION

PATENT NO. : 11,375,462 B2
APPLICATION NO. : 16/497416
DATED : June 28, 2022
INVENTOR(S) : Mythri Hunukumbure et al.

It is certified that error appears in the above-identified patent and that said Letters Patent is hereby corrected as shown below:

On the Title Page

Item (30), Line 1, "1704731" should read --1704731.7--.

Signed and Sealed this
Twenty-seventh Day of September, 2022

Katherine Kelly Vidal
Director of the United States Patent and Trademark Office